United States Patent
Haid et al.

(10) Patent No.: US 11,552,998 B2
(45) Date of Patent: Jan. 10, 2023

(54) DEVICE AND SYSTEM WITH A ROOT OF TRUST

(71) Applicant: Infineon Technologies AG, Neubiberg (DE)

(72) Inventors: Josef Haid, Graz (AT); Stefan Rueping, Lengdorf (DE)

(73) Assignee: Infineon Technologies AG, Neubiberg (DE)

(*) Notice: Subject to any disclaimer, the term of this patent is extended or adjusted under 35 U.S.C. 154(b) by 400 days.

(21) Appl. No.: 16/546,803

(22) Filed: Aug. 21, 2019

(65) Prior Publication Data

US 2020/0067987 A1    Feb. 27, 2020

(30) Foreign Application Priority Data

Aug. 23, 2018   (DE) .......................... 102018214301.3

(51) Int. Cl.
*H04L 9/40*       (2022.01)

(52) U.S. Cl.
CPC .......... *H04L 63/20* (2013.01); *H04L 63/0281* (2013.01)

(58) Field of Classification Search
None
See application file for complete search history.

(56) References Cited

U.S. PATENT DOCUMENTS

| | | | | |
|---|---|---|---|---|
| 2014/0181505 | A1* | 6/2014 | Moore | H04L 63/126 713/164 |
| 2015/0012737 | A1* | 1/2015 | Newell | G06F 21/44 713/2 |
| 2016/0378996 | A1 | 12/2016 | Smith et al. | |
| 2017/0055148 | A1* | 2/2017 | Zimmerman | H04L 9/0825 |
| 2018/0109538 | A1* | 4/2018 | Kumar | H04L 63/08 |
| 2018/0285600 | A1* | 10/2018 | Hunt | H04L 9/0877 |
| 2019/0026477 | A1* | 1/2019 | Smith | G06F 21/6218 |

FOREIGN PATENT DOCUMENTS

EP        2484564 B1      1/2014

OTHER PUBLICATIONS

"Root of Trust DEfinitions and Requirements", Global Platform, Global Platform Security Task Force, Version 1.0.1, Mar. 2017. (Year: 2017).*
German Patent Office, Office Action issued for DE 102018214301.3, 6 pgs., dated Jun. 19, 2019.

* cited by examiner

*Primary Examiner* — Schquita D Goodwin
*Assistant Examiner* — Jonathan A Sparks
(74) *Attorney, Agent, or Firm* — Banner & Witcoff Ltd.

(57) ABSTRACT

A device includes a root of trust and a controller to perform a device function of the device using the root of trust. The root of trust is designed to control and/or observe the controller at least partially for the performance of the device function.

13 Claims, 3 Drawing Sheets

DEVICE AND SYSTEM WITH A ROOT OF TRUST

TECHNICAL FIELD

The present disclosure relates to a device with a root of trust and a system with a device of this type. The present disclosure also relates to an active root of trust.

BACKGROUND

Security-based applications can use a root of trust to ensure the trustworthiness of a device which is used at a distance from a partner device. Examples of this include chip cards containing chips that provide a corresponding function, such as for use in ATMs, access systems or the like.

A securing of corresponding devices is also sought in the domain of the Internet of Things (IoT) in order to enable sustainable functionalities or business models at system level. Distributed devices, and, in particular, IoT devices are therefore required to be safe. This can be achieved by adding a security component to the IoT device, for example a security controller. A security controller of this type is also known as a Root of Trust (RoT) and is used, for example, as a Trusted Platform Module (TPM).

Devices and systems with a root of trust which have a high level of security would be desirable.

SUMMARY

Example embodiments provide a device with a root of trust and a control unit to perform a device function of the device using the root of trust. The root of trust is designed to control and/or observe the control unit at least partially for the performance of the device function. The configuration of the root of trust is such that it at least partially controls and/or observes the control unit for the performance of the device function, enabling disengagement from the concept that the root of trust is used as a subordinate advisor so that the root of trust is responsible for the operation of the device. A high level of security is thereby achieved.

According to one example embodiment, a system includes such a device and a security computer network which is set up to communicate directly with the root of trust and to provide security applications for the device. This makes it possible to respond to changing security requirements by updating the security applications in the security computer network so that an obsolescence of the root of trust can be prevented or at least delayed.

Further example embodiments are defined in the dependent claims.

BRIEF DESCRIPTION OF THE DRAWINGS

Example embodiments are explained below with reference to the attached drawings, in which.

DETAILED DESCRIPTION

Before example embodiments are explained in detail below with reference to the drawings, it should be noted that identical, functionally identical or equivalent elements, objects and/or structures are denoted with the same reference numbers in the different figures, so that the description of these elements presented with the different example embodiments is interchangeable or can be applied to any of said elements.

The following example embodiments relate to a device with a root of trust. A root of trust is understood to mean one or more functions, the performance of which and, in particular, the result thereof, are considered trustworthy. The results of such functions can be further processed so that the results of corresponding further processing are also considered secure or trustworthy, as long as the processing function is considered secure. For example, the Root of Trust (RoT) can perform functions such as encryption, integrity checks, and/or rights management. The RoT can be implemented at least partially in the program code (software) and/or at least partially in hardware.

Figure 1:
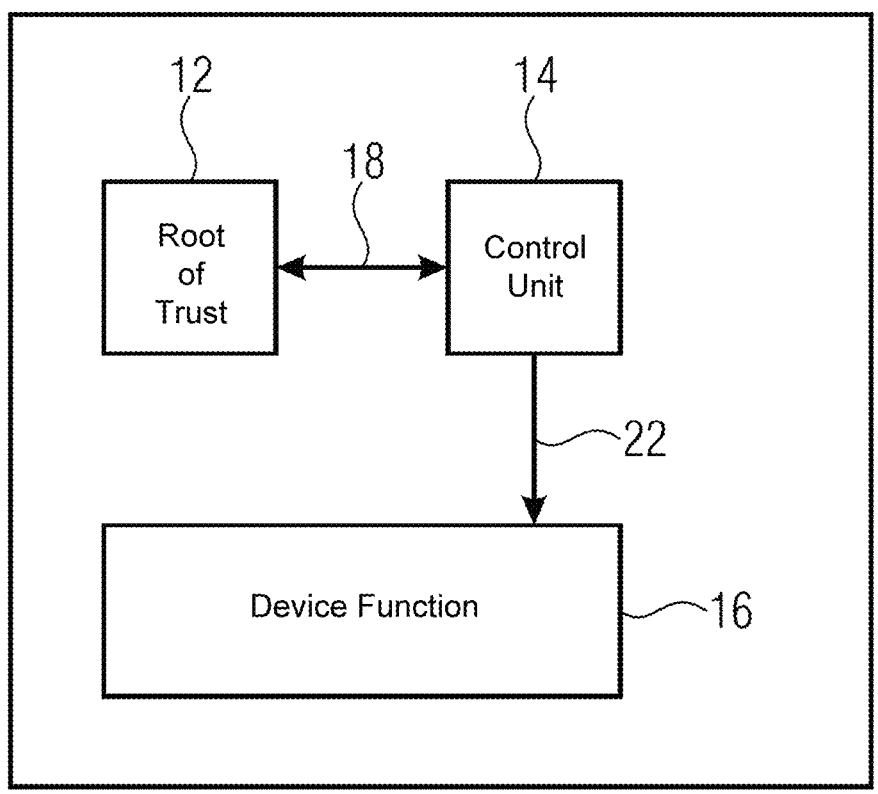
FIG. 1 shows a schematic block diagram of a device according to one example embodiment which has a root of trust and a control unit.

FIG. 1 shows a schematic block diagram of a device 10 according to one example embodiment which has a root of trust 12 and a control unit 14. The control unit 14 may have a microcontroller, a processor/CPU, a field programmable gate array (FPGA) and/or other programmable unit which is designed to execute a corresponding program code on the basis of the stored programming. The control unit 14 may be designed to perform a device function 16 of the device 10 using the root of trust 12. Although the device 10 may be any device, the device 10 according to one example embodiment is designed as an Internet of Things (IoT) device and has wireless and/or wired communication interfaces configured for this purpose. The device 10 may, for example, be a connected device and/or a security device.

The device function 16 may be any function, for example an actuator function and/or a sensor function. Sensor functions can be implemented, for example, which comprise the recording of one or more measured values, such as temperature, a distance, a flow of a fluid or solid, an evaluation of data traffic, a camera image, a video recording, an acoustic recording or the like. Alternatively or additionally, an actuator function implemented by the device may include the actuation of an actuator to influence an internal or external component of the device, such as a switch, an output of information, an acoustic reproduction or a mechanical movement of a component. The device 10 may be designed, for example, to comprise a video camera, a loudspeaker, a microphone or the like.

The device 10 can be designed to perform the device function 16 using the root of trust 12. The root of trust 12 can thus be designed to control and/or observe the control unit 14 at least partially for the performance of the device function 16. In contrast to devices in which the control unit uses the root of trust and in which the root of trust is configured as a subordinate device (slave) of the system and operates passively on request, the root of trust according to one example embodiment performs the role of controlling and/or observing the device function 16. While the root of trust, for example a security controller, is used in known devices to support the control unit in the implementation of a secure system, the device 10 has a root of trust such that the root of trust 12 is configured to control and/or observe the control unit 14 at least partially. This means that the root of trust 12 can be designed to initiate the security function. Although the control unit 14 may physically be the controlling unit (master), it can be implemented logically as a slave and respond to the instructions of the root of trust 12.

One example of an implementation can be obtained, for example, through the specification by the root of trust 12 of time intervals, security protocols and/or data to be used which are intended to be embedded and queried in a corresponding query by the control unit 14. One example of this is the instruction by the root of trust 12 to the control unit 14 wherein the latter is instructed to query the root of trust 12 at certain time intervals or to make use of its function. This means that the root of trust 12 can forward instructions to the control unit 14 which at least partially define a use of the root 12 of trust for the device function 16.

A wired or wireless communication channel 18 between the root of trust 12 and the control unit 14 can be provided for this purpose. According to one example embodiment, the communication channel 18 can be implemented physically on the basis of conductor paths and/or on the basis of a radio path. Alternatively or additionally, the communication channel 18 can be implemented by an information exchange between two logical units of a computing unit which are provided by a common computing unit, such as a processor, security controller or the like.

The device function 16 can be disposed inside the control unit 14, for example as software-implemented code in a memory, but can also be provided outside the control unit 14, for example as hardware components which are controllable by the control unit 14 via a wireless or wired communication channel 22. According to one example embodiment, the communication channel 22 can be implemented physically on the basis of conductor paths and/or on the basis of a radio path. Alternatively or additionally, the communication channel 22 can be implemented by an information exchange between two logical units of a computing unit which are provided by a common computing unit, such as a processor, security controller or the like.

Along with the sensor functions and/or actuator functions explained above, a device function 16 can therefore also be implemented in such a way that the control unit 14 observes or monitors a wired interface of the device 10, for example an SPI (Serial Peripheral Interface), a CAN (Controller Area Network) interface or an I2C (Inter-Integrated Circuit) interface. Alternatively or additionally, corresponding data buses or communication buses of the device can also be monitored. According to one example embodiment, it is alternatively or additionally provided that a debugging interface of the device is monitored, for example to provide communication with an external debugging bus.

Through the instructions of the root of trust 12 to the control unit 14, the root of trust 12 can be configured as a logical master of the device 10, whereas the control unit 14 is configured as a logical slave of the device 10.

Figure 2:
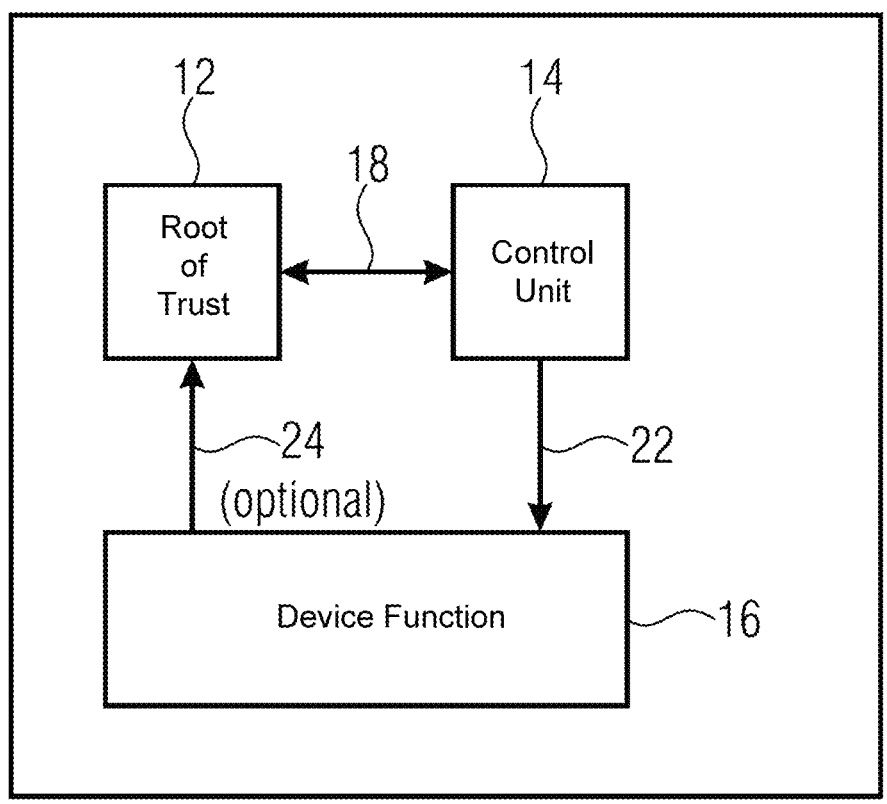
FIG. 2 shows a schematic block diagram of a device according to one example embodiment in which the root of trust is configured to monitor the performance of one of the device functions by the control unit.

FIG. 2 shows a schematic block diagram of a device 20 according to one example embodiment in which, compared with the device 10, the root of trust is additionally configured to monitor the performance of the device function 16 by the control unit 14. For this purpose, the root of trust 12 can be connected by means of a wired or wireless communication channel 24 to the device function 16 and can query or receive a change of the device function 16. As a result, the root of trust 12 can thus conclude whether the instructions forwarded to the control unit 14 have been implemented or have at least produced the desired results. According to one example embodiment, the communication channel 24 can be implemented physically on the basis of conductor paths and/or on the basis of a radio path. Alternatively or additionally, the communication channel 24 can be implemented by an information exchange between two logical units of a computing unit which are provided by a common computing unit, such as a processor, security controller or the like.

Instead of the communication channel 24, the root of trust 12 can also be designed to check the control unit 14 by querying corresponding data or information via the communication interface 18.

Figure 3:
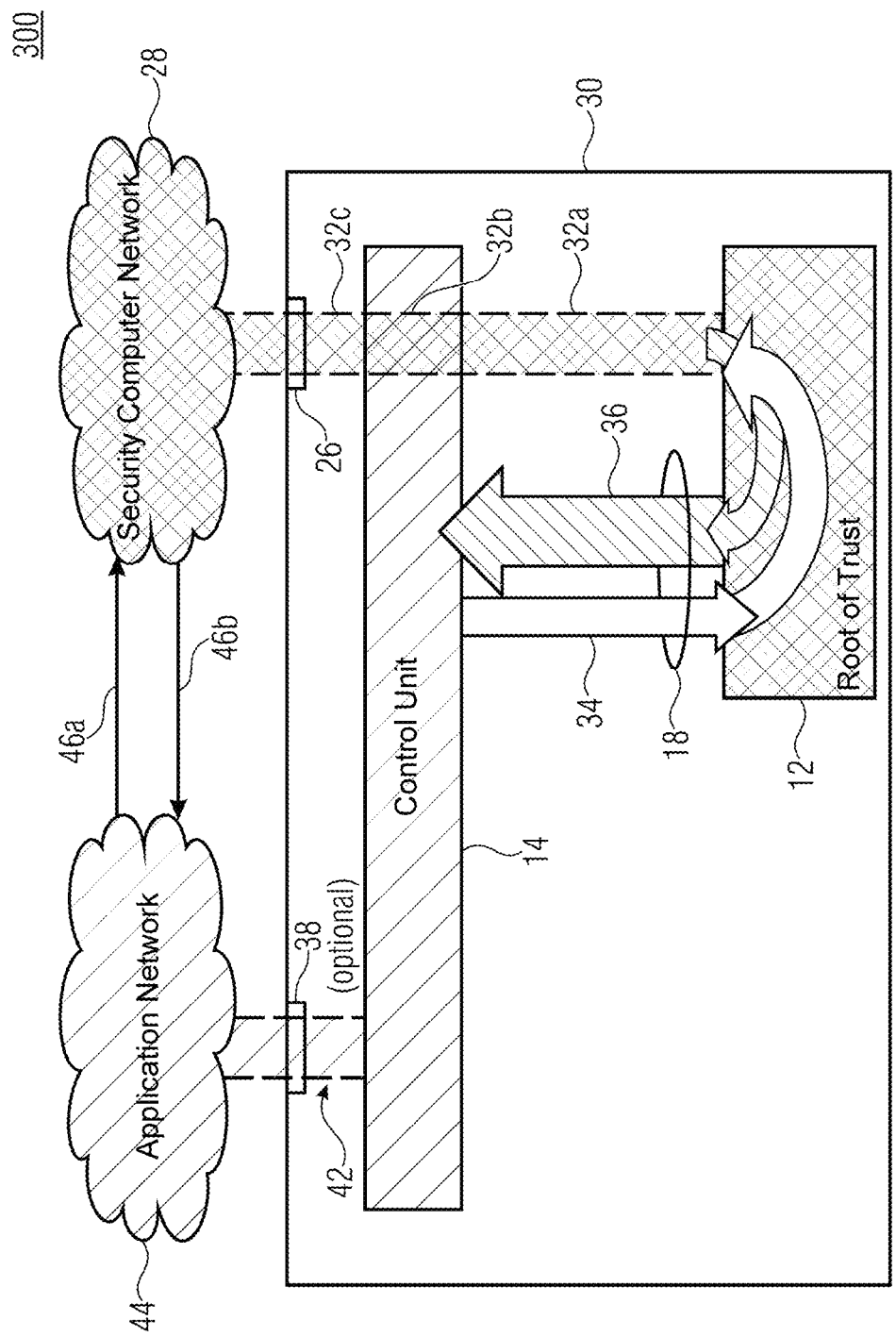
FIG. 3 a schematic block diagram of a system according to one example embodiment.

FIG. 3 shows a schematic block diagram of a system 300 according to one example embodiment which comprises a device 30 according to one example embodiment. Alternatively or in addition to the device 30, a different device described herein can form part of the system 300, for example the device 10 and/or 20.

The device 30 can have a communication interface 26 which is configured for communication between the control unit 14 and a security computer network. The communication interface 26 can be implemented in wired or wireless form and can enable a connection of the device 30 to one or more local computer-based services. The device 30 can be designed, for example, as an IoT device. The security computer network may be a remote central or local device and can be implemented, for example, as a cloud.

The root of trust 12 can be configured as a mediator (proxy) for communication between the control unit 14 and the security computer network 28. This means that the root of trust 12 can be configured as a mediator between the control unit 14 and the security computer network 28 so that the communication between the device 30 and the security computer network takes place partially or completely with the incorporation or use of the root of trust 12. As a result, communication between the control unit 14 and the security computer network 28 itself takes place partially or exclusively using the root of trust 12.

The control unit 14 can be configured to use the communication channel 18 for the communication between the control unit 14 and the security computer network 28. The root of trust 12 can be connected via a communication channel 32 to the communication interface 26. A direct physical or logical connection between the root of trust 12 and the communication interface 26 can be provided for this purpose. Alternatively or additionally, as shown in FIG. 3, the control unit 14 can be connected physically or logically by means of the communication section 32c to the communication interface 26 and can be instructed or controlled by the root of trust 12 via a communication section 32a for a corresponding communication. According to one example embodiment, instructions of this type can have coded or uncoded commands, wherein, according to one example embodiment, the root of trust 12 controls the control unit 14 in such a way that the latter merely forwards the communication to the communication interface 26, e.g. by means of a communication section 32b which is designed, for example, to tunnel logically through the control unit 14, which means that the control unit 14 has no influence on the information content of the communication with the security computer network 28 performed by the root of trust 12.

The communication channel 32 can be usable, for example, to upload or deliver a firmware update. This enables the use of already known or existing communication interfaces in the context of example embodiments described herein.

The control unit 14 and the root of trust 12 can exchange signals or information via both the communication channel 18 and the communication section 32a. This can be achieved by providing two communication interfaces on both the control unit 14 and the root of trust 12. Alternatively, both communications 18 and 32a can also be implemented via common interfaces and/or common conductor paths or radio paths using different services or logical levels.

According to the example embodiment shown in FIG. 3, the root of trust can exchange signals or data with the communication interface 26 incorporating the control unit 14. For this purpose, the corresponding communication is tunneled, for example, through the logical level of the control unit 14, e.g. using a protocol to set up a virtual private network (VPN) and the wireless or wired communication section 32c between the control unit 14 and the communication interface 26. A correspondingly tunneled communication section 32b can be designed in such a way that the control unit 14 dispenses with an evaluation of the corresponding communication. This means that the communication is encrypted at this point, for example within the protocol that is used, so that the control unit leaves the data traffic unaffected.

An exchange of data and/or commands between the control unit 14 and the root of trust 12 can take place via the communication channel 18. The control unit 14 can thus provide the root of trust 12, for example, with information or data 34 which are further processed by the root of trust 12 and/or the security computer network 28 via the communication 32 with the communication interface 26. Alternatively or additionally, the root of trust 12 can forward data and/or control commands 36 to the control unit 14, for example instructions to query actions or information, e.g. the information 34, in order to perform security functions of the security computer network 28. The root of trust 12 can thus act as a mediator/proxy for the communication between the control unit 14 and the security computer network 28. As a mediator, the root of trust 12 can receive queries from one communication side, for example the control device 14 or the security computer network 28, in order to then set up a connection via its own communication address to the other side, e.g. the security computer network 28 or the control unit 14.

According to one example embodiment, as shown in FIG. 3, the control unit 14 is possibly connected to the communication interface 26, but the control unit 14 is designed merely to forward communication signals between the communication interface 26 and the root of trust 12 in order to implement the tunnel, whereas the root of trust 12 is designed to extract information from the corresponding communication signals, e.g. for the provision of the commands 36, and provide these as a mediator to the control unit 14. This means that the security-related instructions are provided by the root of trust 12 so that an attack on the control unit 14 via unsecured paths is at least impeded.

According to one example embodiment, a logical communication takes place with the security computer network 28 for the provision and/or performance of security functions for the device 30, exclusively using the root of trust 12. This enables the root of trust 12 to identify a possible corruption of the control unit 14 so that a high level of security is obtained. Since the communication 32 between the root of trust 12 and the security computer network 28 takes place directly at least at a logical level, attackers are possibly impeded in overcoming the implemented security mechanisms. In addition, it is possible for the functions of the root of trust 12 to be modified and, in particular, updated by the security computer network 28, so that up-to-date security mechanisms can always be used without the need to carry out a complex update of the control unit 14. In particular, according to one example embodiment, the root of trust 12 can be designed to communicate with the security computer network 28 using a security communication protocol, for example a Transport Layer Security (TLS) protocol.

The system 300 thus enables the implementation of a strategy to avert attacks against the system 300 and, in particular, to transfer the device 30 into the cloud (security computer network 28). Analysis of new attacks and attacks unknown during the design of the device 30 in the security computer network 28 is alternatively or additionally enabled, e.g. through the querying of corresponding information by the device 30. This is enabled, in particular, through the secure channel 32. The security service is thus not necessarily implemented in the hardware of the device 30, but can be implemented partially or completely in the security computer network 28.

According to one example embodiment, the device 30 comprises an optional wireless or wired communication interface 38 which enables a direct or indirect communication between the control unit 14 and an application network 44. This means that, in addition to the secure communication of the control unit 14 via the root of trust 12, communication is possible with other or further services, e.g. those services which do not require continuous verification of the device 30. The application network 44 can similarly be implemented as a distributed or central network. Example embodiments provide that an exchange of signals 46a and/or 46b takes place between the security computer network 28 and the application network 44. A corresponding control protocol or other information relating to the device 30 can thus be forwarded, for example by means of a signal 46a, to the security computer network 28. This can enable the security computer network 28 to adapt the security queries to the device 30, e.g. by adapting the corresponding queries to the services provided. Different services may therefore require or support different security mechanisms.

Alternatively or additionally, it can be provided that the security computer network 28 provides the application network 44 with information relating to identified security information, e.g. that the device 30 is verified or authenticated for specific services, that security is guaranteed or, in the event of an attack, that the device 30 is to be excluded from specific services. For this purpose, the security computer network 28 can forward a signal 46b with corresponding information to the application network 44.

According to one example embodiment, the device 30 is designed as a connected device. This and other example embodiments enable an observation or monitoring of the device by the root of trust, e.g. by storing a corresponding program code (software) in a memory to which the control unit 14 has access, wherein the program code provides information which is queried by the security computer network 28 while this information is forwarded by the root of trust 12 to the security computer network 28. The root of trust 12 can furthermore also monitor corresponding communication lines, in particular wired buses, such as address lines. Alternatively or additionally, other debugging information which is accessible to the root of trust 12 can be monitored, wherein the root of trust 12 can be connected to corresponding equipment of the respective device for this purpose, in order to query the information.

Example embodiments provide communication between the application network 44 and the security computer network 28 in order to exchange information enabling a notification in relation to security problems and/or to control the security computer network 28, e.g. to specify when the device is to be verified.

In other words, the security computer network 28 or the security services can interact and/or communicate with the application services of the application computer network 44. Security monitoring can be adapted dynamically, for example on the basis of the tasks and/or importance of the device 30. Algorithms of the security computer network 28 can be implemented, for example, in an artificial intelligence (AI) context and can be designed to analyze threats to the device 30 or the system 300 quickly, possibly in real time, and to instigate corresponding verifications of the device 30. The functionality of the root of trust 12 is therefore not limited to predefined security functions. As a result, the security controller becomes an important component, since it acts as a mediator for the communication between the control unit 14 and the security computer network 28.

Example embodiments enable the secure monitoring of hardware signals e.g. on printed circuit boards, monitoring of the software architecture in the control unit of the device and/or an adaptation thereof, so that active functions of the root of trust 12 are supported. Support of high-performance, cloud-based security services and/or addition of new security aspects is/are furthermore enabled, thus enabling individualization of the security services.

Example embodiments are based on the realization that it offers advantages that security applications communicate with the device only via the root of trust, preferably exclusively via the root of trust. This enables an active security system. This enables the security of the device to be checked externally and thus enables new fields of application compared with applications in which security is checked in situ, e.g. in known systems, such as, for example, an ATM, where the security of the chip card is checked in the ATM.

A high level of security can be obtained through an active monitoring of this type. In addition, a device can be equipped during manufacture or delivery thereof with only a part of the security functions, for example a type of basic set of security functions. Further security functions can subsequently be retrofitted in a secure manner, e.g. during a customization. This enables a design of devices with low complexity and/or low cost. In addition, the modification and/or addition of security features enables a long-lasting use of the devices, particularly in example embodiments in which the protecting intelligence is implemented at least partially in the cloud where changing, novel and computationally intensive algorithms can be used. I have not added the CCS Benefits part under Part 8 of the patent application here. Please let me know if you agree with this.

The example embodiments described herein overcome the problems wherein devices are distributed in the field and are therefore at a distance from the central locations and can therefore be secured by logical methods only. Attacks are becoming increasingly sophisticated and challenging. In contrast, known roots of trust provide only a limited scope of protection facilities in order to protect devices. Since IoT devices, in particular, are cost-sensitive applications, the number of security precautions which can be implemented within a cost framework is also limited for the control units of RoT devices. Example embodiments are based on the concept that the root of trust controls the control unit, whereas known concepts are designed in such a way that the processor of the root of trust is designed to support the main processor in creating a secure system. While known roots of trust can only implement security functions which can be implemented in firmware within the device, such as the TPM (Trusted Platform Module) feature set as described in the TCG specification, and new functionality can thereby be obtained only through a renewal of the firmware, example embodiments enable the implementation of changing and improved security functions through modified queries for information or data. Example embodiments furthermore enable the utilization of intelligent security in distributed computer networks, such as a cloud. Example embodiments therefore have a remote security service or a cloud security service which communicates by means of the root of trust in the device. The root of trust acts as a mediator (proxy) between the security services and the microcontroller in the device. The root of trust has the facility to actively monitor the IoT device.

Although some aspects have been described in connection with a device, it is obvious that these aspects also represent a description of the corresponding method, so that a block or a component of a device is also to be understood as a corresponding method step or as a feature of a method step. Similarly, aspects which have been described in connection with or as a method step also represent a description of a corresponding block or detail or feature of a corresponding device.

Depending on specific implementation requirements, example embodiments of the invention can be implemented in hardware or in software. The implementation can be performed using a digital storage medium, for example a floppy disk, a DVD, a Blu-ray disc, a CD, a ROM, a PROM, an EEPROM or a FLASH memory, a hard disk or other magnetic or optical storage device on which electronically readable control signals are stored which can interwork or interwork with a programmable computer system in such a way that the respective method is carried out. The digital storage medium can therefore be computer-readable. Some example embodiments according to the invention therefore comprise a data medium which has electronically readable control signals which are capable of interworking with a programmable computer system in such a way that one of the methods described herein is carried out.

In some example embodiments, a programmable logic component (for example a field programmable gate array, FPGA) can be used to perform some or all of the functionalities of the methods described herein. In some example embodiments, a field programmable gate array can interwork with a microprocessor in order to carry out one of the methods described herein. Generally speaking, the methods are carried out in some example embodiments by any hardware device. This may be universally usable hardware, such as a computer processor (CPU) or specific hardware for the method such as, for example, an ASIC.

The invention claimed is:
1. A device, comprising:
a root of trust security controller; and
a controller to perform a device function of the device;
wherein the root of trust security controller is designed to control the controller at least partially for the performance of the device function, and the root of trust security controller is configured as a logical master of the device and the controller is configured as a logical slave of the device.
2. The device as claimed in claim 1, wherein the root of trust security controller is designed to monitor the performance of the device function by the controller.
3. A device, comprising:
a root of trust security controller;
a controller to perform a device function of the device; and
a communication interface for communication between the controller and a security computer network,
wherein the root of trust security controller is designed to control the controller at least partially for the performance of the device function, and the root of trust security controller is configured as a proxy for the communication between the controller and the security computer network.

4. The device as claimed in claim 3, wherein the controller is connected to the communication interface and is designed to transmit communication signals between the communication interface and the root of trust security controller, and the root of trust security controller is designed to extract information from the communication signals and provide it as a proxy of the controller.

5. The device as claimed in claim 1, wherein the device is designed to communicate with a security computer network to provide security functions for the device, exclusively via the root of trust security controller.

6. The device as claimed in claim 1, wherein the root of trust security controller is designed to forward instructions to the controller to control the performance of the device function.

7. The device as claimed in claim 6, wherein the instructions comprise instructions which at least partially define a use of the root of trust security controller for the device function.

8. The device as claimed in claim 1, wherein the device is designed as a networked device.

9. The device as claimed in claim 1, wherein the device is designed as an Internet of Things device.

10. The device as claimed in claim 1, wherein the device function is a sensor function and/or an actuator function.

11. The device as claimed in claim 1, wherein the device is configured for direct communication between the controller and an application network.

12. A system, comprising:
a device as claimed in claim 1; and
a security computer network which is configured to communicate directly with the root of trust security controller and to provide security applications for the device.

13. The system as claimed in claim 12, wherein the security computer network communicates with the device exclusively via the root of trust security controller.

* * * * *